US009278363B2

(12) United States Patent
Aoki et al.

(10) Patent No.: US 9,278,363 B2
(45) Date of Patent: Mar. 8, 2016

(54) NOZZLE AND HONEYCOMB FILTER PRODUCTION APPARATUS USING THE SAME

(71) Applicant: NGK Insulators, Ltd., Nagoya (JP)

(72) Inventors: Yasuho Aoki, Nagoya (JP); Tasuke Narishige, Nagoya (JP); Shinya Yoshida, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 14/217,835

(22) Filed: Mar. 18, 2014

(65) Prior Publication Data

US 2014/0290568 A1 Oct. 2, 2014

(30) Foreign Application Priority Data

Mar. 26, 2013 (JP) ................................ 2013-063772

(51) Int. Cl.

*B05C 19/00* (2006.01)
*B05B 13/06* (2006.01)
*B05B 7/06* (2006.01)
*B05B 1/14* (2006.01)
*B05B 7/14* (2006.01)
*B01J 37/02* (2006.01)
*B05B 7/00* (2006.01)
*B05B 12/08* (2006.01)
*B01J 35/04* (2006.01)

(52) U.S. Cl.

CPC ............... *B05B 1/14* (2013.01); *B01J 37/0232* (2013.01); *B05B 7/0075* (2013.01); *B05B 7/1486* (2013.01); *B05B 12/084* (2013.01); *B01J 35/04* (2013.01); *B05B 7/1409* (2013.01); *B05B 7/1454* (2013.01)

(58) Field of Classification Search

USPC ............ 118/308, 309, 306, 317, 62, 63, 602, 118/313, 315; 427/180, 230, 236

See application file for complete search history.

(56) References Cited

U.S. PATENT DOCUMENTS

| | | | | |
|---|---|---|---|---|
| 568,776 | A | 10/1896 | Leggett | |
| 4,987,001 | A * | 1/1991 | Knobbe et al. | 427/478 |
| 8,495,968 | B2 | 7/2013 | Tsuji et al. | |
| 8,534,221 | B2 | 9/2013 | Tsuji et al. | |
| 2012/0021133 | A1* | 1/2012 | Schroeder et al. | 427/459 |

FOREIGN PATENT DOCUMENTS

| | | | |
|---|---|---|---|
| CN | 201 644 254 | U | 11/2010 |
| EP | 0 382 503 | A1 | 8/1990 |

(Continued)

OTHER PUBLICATIONS

Extended European Search Report (Application No. 14160456.1) dated Jul. 3, 2014.

*Primary Examiner* — Yewebdar Tadesse
(74) *Attorney, Agent, or Firm* — Burr & Brown, PLLC

(57) ABSTRACT

A nozzle is mounted on an end of an ejector for ejecting an aerosol on an ejection side in a honeycomb filter production apparatus. The nozzle is formed into a shape having a longitudinal direction. A single introduction port is formed at an end surface of the nozzle on one side in the longitudinal direction, and a plurality of discharge ports are formed at an end surface of the nozzle on the other side in the longitudinal direction. A single introduction passage extends linearly from the single introduction port in the longitudinal direction. A plurality of discharge passages are each branched from an end portion of the introduction passage on a side opposite to the introduction port and extend to corresponding one of the discharge ports in a direction tilted from the longitudinal direction.

2 Claims, 7 Drawing Sheets

(56) References Cited

FOREIGN PATENT DOCUMENTS

| | | | |
|---|---|---|---|
| EP | 1 777 070 | A2 | 4/2007 |
| EP | 2 371 451 | A1 | 10/2011 |
| JP | 60-102965 | A1 | 6/1985 |
| JP | 2001-347194 | A1 | 12/2001 |
| JP | 2011-212671 | A1 | 10/2011 |
| JP | 2012-157855 | A1 | 8/2012 |
| WO | 2010/077936 | A1 | 7/2010 |

* cited by examiner

NOZZLE AND HONEYCOMB FILTER PRODUCTION APPARATUS USING THE SAME

BACKGROUND OF THE INVENTION

1. Field of the Invention

The present invention relates to a nozzle and a honeycomb filter production apparatus using the nozzle.

2. Description of the Related Art

Japanese Patent Application Laid-open No. 2012-157855 discloses, as an apparatus to be used for producing a honeycomb filter, an apparatus including: a workpiece securing section for securing a base of a honeycomb filter; a powder transfer section provided on one side of the workpiece securing section, for transferring powder as an aerosol together with an air current through use of pressurized gas; an introduction section provided between the powder transfer section and the workpiece securing section, for further mixing the aerosol with another gas and introducing the mixed gas into the base secured in the workpiece securing section at a time of use of the apparatus; and a suction section provided on the other side of the workpiece securing section, for sucking the gas that has passed through the base secured in the workpiece securing section by reducing pressure on the other side of the workpiece securing section as compared to the one side of the workpiece securing section through use of suction means. The honeycomb filter produced by the apparatus can be mainly used, for example, as a diesel particulate filter (DPF) for collecting particulate matter (PM) exhausted from a diesel engine or the like.

The honeycomb filter includes a base formed of a porous body having a honeycomb structure, and collection layers for collecting particulate matter (PM), which are provided on surfaces of a plurality of partition walls that define a plurality of cells in the base. The honeycomb filter production apparatus is configured to form the collection layers through deposition of the powder on the surfaces of the plurality of partition walls in the base by introducing "powder-dispersed gas" (aerosol), which is transferred from the powder transfer section, into the plurality of cells in the base.

In the above-mentioned honeycomb filter, it is preferred that the variation in thickness of the collection layers to be formed be small among the plurality of cells. Therefore, in the case where the above-mentioned collection layers are to be provided on a base for a large honeycomb filter, it is preferred that an aerosol be discharged (ejected) from a plurality of different portions to the base in the powder transfer section.

In the apparatus disclosed in Japanese Patent Application Laid-open No. 2012-157855, the powder transfer section mainly includes an ejector and a powder feeding device for feeding a predetermined amount of powder. Therefore, in order to eject an aerosol from the plurality of different portions to the base as described above, a plurality of ejectors and a plurality of powder feeding devices are required, which complicates the configuration of the powder transfer section extremely seriously.

SUMMARY OF THE INVENTION

The present invention has been made to solve the above-mentioned problem, and it is an object of the present invention to eject an aerosol from a plurality of different portions to a base of a honeycomb filter without complicating the configuration of a powder transfer section of a honeycomb filter production apparatus.

A nozzle according to one embodiment of the present invention is a nozzle for introducing thereinto an aerosol being powder-dispersed gas, and discharging the introduced aerosol to an outside. The nozzle can be typically mounted for use on a tip end portion of a part for discharging the aerosol to the introduction section in the powder transfer section of the honeycomb filter production apparatus disclosed in Japanese Patent Application Laid-open No. 2012-157855.

The nozzle according to one embodiment of the present invention has a feature in that the nozzle includes: one or a plurality of introduction ports for introducing the aerosol into the nozzle; and a plurality of discharge ports for discharging the introduced aerosol from the one or the plurality of introduction ports to the outside, the plurality of discharge ports being larger in number than the one or the plurality of introduction ports. The nozzle may typically include a single introduction port and a plurality of discharge ports. The nozzle may further include: a single introduction passage connected to the single introduction port; and a plurality of discharge passages each branched from an end portion of the single introduction passage on a side opposite to the single introduction port and connected to corresponding one of the plurality of discharge ports.

In the case where the nozzle is formed into a shape having a longitudinal direction, it is preferred that the single introduction port be formed at an end surface of the nozzle on one side in the longitudinal direction, that the plurality of discharge ports be formed at an end surface of the nozzle on another side in the longitudinal direction, that the single introduction passage extend linearly from the single introduction port in the longitudinal direction of the nozzle, and that the plurality of discharge passages each extend radially from the end portion of the single introduction passage to the corresponding one of the plurality of discharge ports in a direction tilted from the longitudinal direction of the nozzle.

In this case, it is particularly preferred that the single introduction passage be disposed coaxially with respect to a center axis line of the nozzle in the longitudinal direction. In addition, it is preferred that, when the nozzle is viewed along the longitudinal direction from the another side of the longitudinal direction, the plurality of discharge ports be disposed at positions which are rotationally symmetric with respect to the center axis line of the nozzle in the longitudinal direction.

An aerosol can be ejected from a plurality of different portions to a base of a honeycomb filter through use of a single ejector and a single powder feeding device by mounting the nozzle according to one embodiment of the present invention on an ejection end of the single ejector. That is, the aerosol can be ejected from the plurality of different portions to the base of the honeycomb filter without complicating the configuration of the powder transfer section of the honeycomb filter production apparatus.

When a ratio of a "sum of opening areas of the plurality of discharge ports" with respect to an "opening area of the single introduction port" is defined to be "$\alpha$" regarding the nozzle according to one embodiment of the present invention, it is preferred that "$\alpha$" be 1 or more. It was found that, in the above-mentioned configuration, "clogging" caused by the deposition of powder is less liable to occur in the plurality of discharge passages, compared to the case where "$\alpha$" is less than 1 (described later in detail).

Further, when the number of the plurality of discharge ports is defined to be "n", it is more preferred that "$\alpha$" be 1 or more and $\sqrt{n}$ or less. It was found that, in the above-mentioned configuration, the degree of symmetry with respect to the center axis line of the nozzle in the longitudinal direction regarding a distribution state of an air velocity of an aerosol ejected from the nozzle is enhanced compared to the case where "α" is more than √n (described later in detail). The description that "the degree of symmetry with respect to the center axis line of the nozzle in the longitudinal direction is high" means that the variation in air velocity of an aerosol in a circumferential direction is small in regions at the same distance from the center axis line of the nozzle in the longitudinal direction.

In the nozzle according to one embodiment of the present invention, it is preferred that the plurality of discharge passages each extend linearly from the end portion of the single introduction passage to the corresponding one of the plurality of discharge ports. In this configuration, the "clogging" caused by the deposition of powder is less liable to occur in those discharge passages, compared to the discharge passages each extending in a curved shape.

DETAILED DESCRIPTION OF THE INVENTION

A honeycomb filter production apparatus according to an embodiment of the present invention (hereinafter sometimes referred to as "apparatus of the present invention") and a nozzle used in the apparatus of the present invention are described with reference to the drawings.

(Advantage of Honeycomb Filter)

First, the advantage of a honeycomb filter having collection layers formed therein, which is produced by the apparatus of the present invention, is described. In the case where the honeycomb filter is used as a filter for removing PM, even when the honeycomb filter is not provided with collection layers, exhaust gas containing PM exhausted from a diesel engine is introduced into one of a plurality of cells defined and formed by porous partition walls in the honeycomb filter through one opening of the one cell, passes through the partition walls of the honeycomb filter, and flows out through the other opening of an adjacent cell. At this time, the PM is collected by the partition walls, with the result that the exhaust gas is purified. However, in this case, when the collection layers are not present on surfaces of the partition walls, the PM enters pores of the partition walls to close the pores, and hence a pressure loss of the honeycomb filter is liable to increase rapidly in an initial stage. In contrast, when the collection layers are present, the PM can be prevented from entering the pores of the partition walls, and hence the pores are not closed with the PM. Therefore, the rapid increase in pressure loss in the initial stage is less liable to occur. That is, the pressure loss can be reduced. Further details of the honeycomb filter are described in Japanese Patent Application Laid-open No. 2012-157855.

(Configuration of Honeycomb Filter Production Apparatus)

Figure 1:
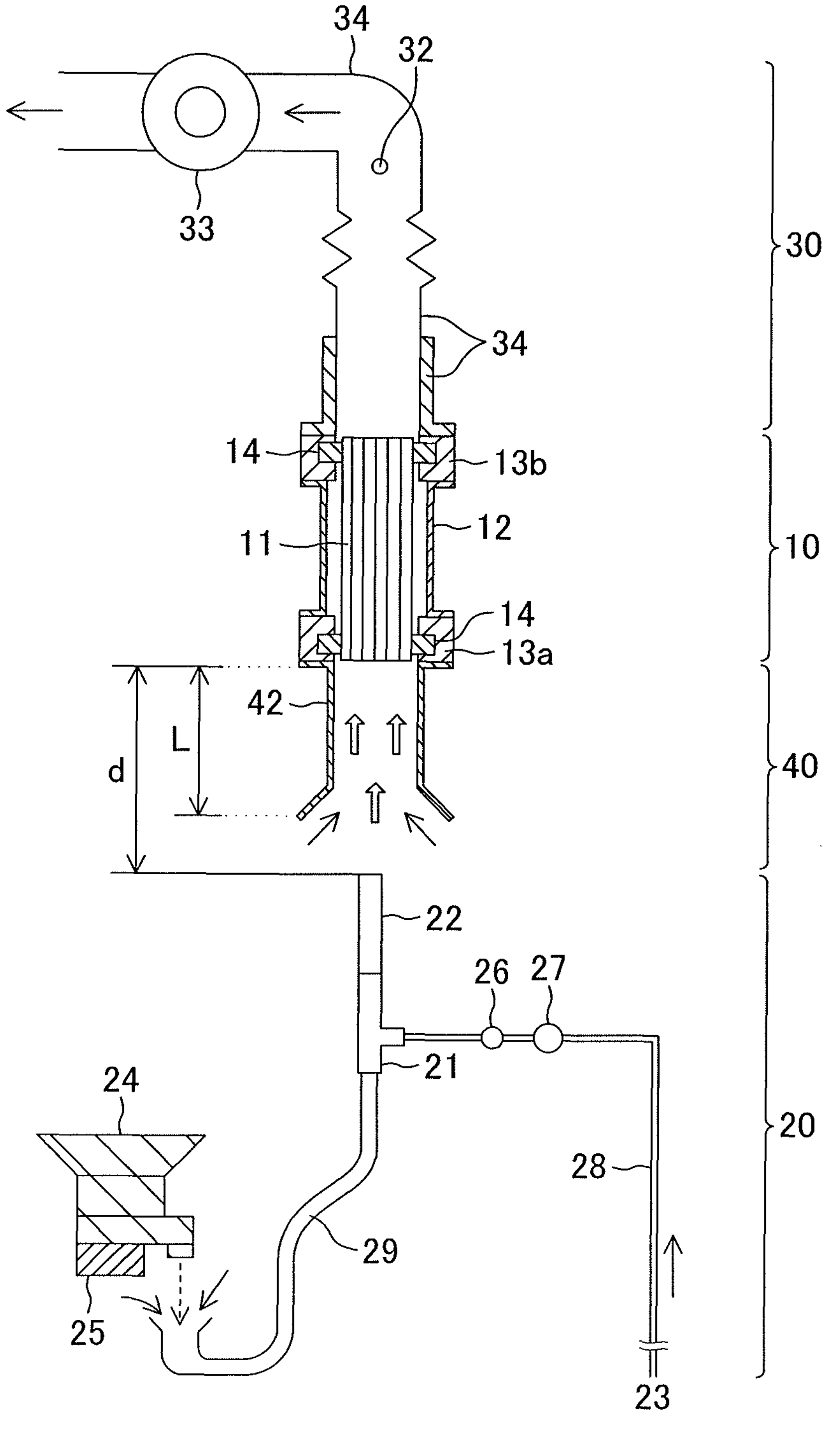
FIG. 1 is a view of an entire honeycomb filter production apparatus according to an embodiment of the present invention.

Next, the configuration and material of the apparatus of the present invention are described. As illustrated in FIG. 1, the apparatus of the present invention includes a workpiece securing section 10, a powder transfer section 20, a suction section 30, and an introduction section 40. FIG. 1 is a schematic view illustrating the periphery of the workpiece securing section 10 in sectional view, and illustrating a base (honeycomb filter precursor) serving as a workpiece 11. The honeycomb filter precursor refers to a base for a honeycomb filter serving as a "honeycomb filter provided with collection layers" after film formation. FIG. 1 illustrates a state during film formation, and arrows illustrated in FIG. 1 represent a flow of an aerosol which is gas (air).

The workpiece securing section 10 serves to secure the workpiece 11 (base). The honeycomb filter precursor serving as the workpiece 11 is a plugged honeycomb structure made of ceramics. That is, the outer shape of the workpiece 11 exhibits a substantially columnar shape having a circumferential surface and two end surfaces. The workpiece 11 includes a plurality of cells extending from one end surface to the other end surface. The cells are defined by partition walls formed of a ceramic porous body having a great number of pores and exhibit a honeycomb structure. Each cell serves as a flow path of gas (fluid). Open ends of one end surface and open ends of the other end surface of a plurality of adjacent cells of the workpiece 11 are plugged alternately so that one end surface and the other end surface both have a houndstooth pattern or a check pattern.

The workpiece securing section 10 includes workpiece chucks 13*a*, 13*b* and a cover 12. When the workpiece chucks 13*a*, 13*b* supported by a support, a frame, or the like (not shown) hold the workpiece 11, the workpiece 11 is secured. The cover 12 covers the circumferential surface (side surface) of the workpiece 11, which prevents gas from entering from the outer circumference side of the workpiece 11. The cover 12 has a substantially cylindrical shape conforming to the substantially columnar workpiece 11. The material for the cover 12 is not particularly limited, and a metal, a resin, and the like are preferred.

The workpiece chucks 13*a*, 13*b* fasten and secure ends of the circumferential surface of the workpiece 11 through intermediation of a packing 14 (sealing member) made of a flexible material such as urethane rubber or silicon rubber, and isolate both the end surfaces from the circumferential surface of the workpiece 11. Thus, an air current becomes stable up to the outer circumference (at all the end surfaces) of the workpiece 11. The end surfaces and the circumferential surface of the workpiece 11 may be isolated from each other by a method of inflating a balloon with an air pressure instead of using the packing 14. Further, in the case where cells to be provided with collection layers are only positioned in a central portion when viewed from the end surface of the workpiece 11, both end surfaces of the workpiece 11 may be held through use of a doughnut-shaped stage member, and both the end surfaces and the circumferential surface of the workpiece 11 may be isolated from each other by the doughnut-shaped stage member. Note that, an air current is formed by suction, and therefore, even when sealing is not complete, powder does not leak to the outside to contaminate the environment, and influences on an air current and on the formation of collection layers are small.

The powder transfer section 20 is provided on one side of the workpiece securing section 10. The powder transfer section 20 produces an aerosol by dispersing, in gas, powder for forming collection layers on the workpiece 11, and introduces the aerosol into the workpiece 11. In this case, the powder transfer section 20 produces an aerosol and hence is located on an inlet side of the aerosol when viewed from the workpiece securing section 10. The powder transfer section 20 mainly includes an ejector 21, a nozzle 22 mounted on an ejection end of the ejector 21, and a powder feeding device 24 for feeding a predetermined amount of powder. The end surface of the workpiece 11 (base) on the powder transfer section 20 side is spaced away from the ejection end of the nozzle 22 (powder transfer section 20) by a distance "d" (see FIG. 1).

The ejector 21 is a device for ejecting powder together with an air current. It is preferred that the ejector 21 have a mechanism for sucking powder through use of a negative pressure generated by a high-speed air current and discharging the powder together with the air current. That is, first, the ejector 21 produces an aerosol. The high-speed air current is fed, at a predetermined flow rate, from a pressurized gas feeder 23 (compressor, etc.) not specifically shown in FIG. 1 to the ejector 21 through a pipe 28 provided with a flow meter 26 and a control valve 27. The powder is fed to the ejector 21 at a predetermined feed amount through a tube 29 by the powder feeding device 24 provided with a weight scale 25 (mass meter).

It is preferred that the ejector 21 suck powder as illustrated in FIG. 1. This is because a bridge (arch) and a rathole in the pipe 28 and the ejector 21 are suppressed, and a problem that powder is not fed is less liable to occur. The (ceramics) powder forming the collection layers includes fine particles and is liable to be aggregated. It is necessary that such powder be caused to adhere to a cell inner surface reliably, and on the other hand, be prevented from adhering to the pipe 28 and the like while being transferred with an air current. The ejector 21 is effective for those operations. Further, it is more preferred that the suction direction of powder and the discharge direction of an aerosol are substantially parallel to each other.

In order to reduce the wear of the ejector 21 due to the friction caused by the contact with powder, it is preferred that the surface of the ejector 21 which comes into contact with powder be formed of diamond, diamond-like carbon (DLC), titanium nitride (TiN), titanium carbonitride (TiCN), silicon carbonitride (SiCN), silicon carbide (SiC), silicon nitride (SiN), a super hard material, or a material made of an alloy thereof or a combination thereof. Further, the surface of the ejector 21 may be subjected to coating, plating, or lining.

Figure 2:
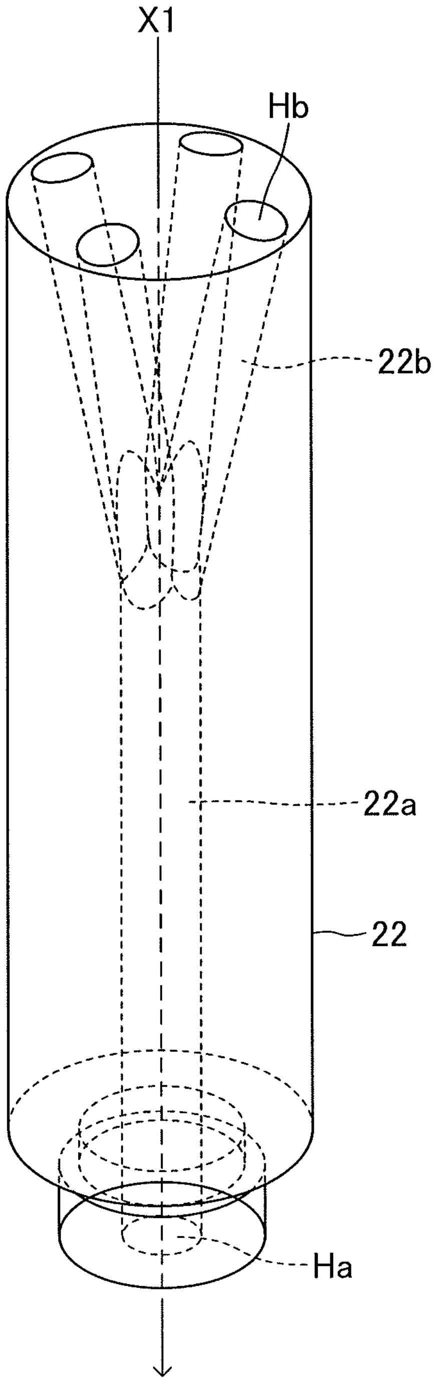
FIG. 2 is an enlarged view of a nozzle illustrated in FIG. 1.
Figure 3:
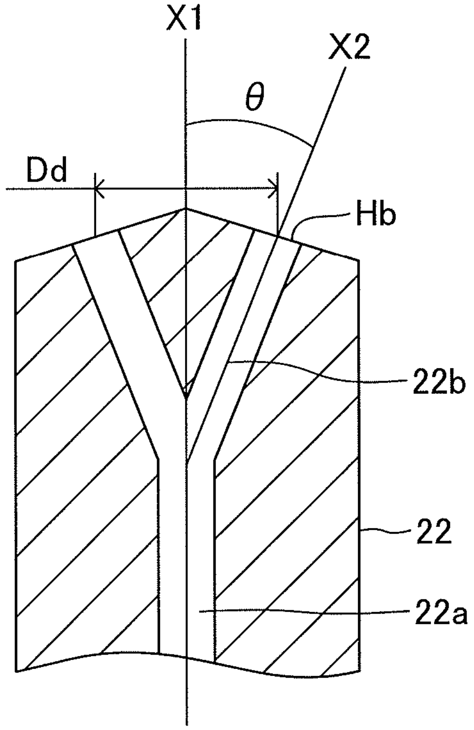
FIG. 3 is a sectional view illustrating a branch portion of a discharge passage in the nozzle illustrated in FIG. 2.

The nozzle 22 is coaxially mounted on the ejection end of the ejector 21. As illustrated in FIG. 2, the nozzle 22 is formed into a columnar shape having a longitudinal direction (axis line X1). A single introduction port Ha is formed coaxially with respect to the axis line X1 at one end (end on a lower side of FIG. 2) of the nozzle 22 in the longitudinal direction. As illustrated in FIGS. 2 and 3, at the other end (end on an upper side of FIG. 2) of the nozzle 22 in the longitudinal direction, a plurality of (four in this example) discharge ports Hb are respectively disposed at positions which are rotationally symmetric with respect to the axis line X1 when the nozzle 22 is viewed along the axis line X1 from the other side (upper side of FIG. 2) of the axis line X1. When the nozzle 22 is viewed from the same direction as the above, a diameter Dd (see FIG. 3) of a pitch circle passing through respective centers (centers of gravity) of the plurality of discharge ports Hb is 1 mm to 300 mm.

A single introduction passage 22*a* connected to the single introduction port Ha and a plurality of (four in this example) discharge passages 22*b* respectively branched from an "end portion on the side opposite to the introduction port Ha" of the introduction passage 22*a* and connected to the corresponding discharge ports Hb are formed in the nozzle 22. The single introduction passage 22*a* extends from the single introduction port Ha linearly and coaxially with respect to the nozzle 22 along the axis line X1. As illustrated in FIG. 3, the plurality of discharge passages 22*b* respectively extend linearly and radially from the branch portion to the corresponding discharge ports Hb in a direction tilted by an angle θ (hereinafter also referred to as "branch angle θ") from the axis line X1 direction of the nozzle 22. It is preferred that the branch angle θ be 5° to 30°. It is preferred that the branch angle θ be the same among the plurality of discharge passages 22*b*.

The introduction passage 22*a* has a columnar shape, and a diameter $D_{in}$ (see FIG. 8 referred to later) thereof is 0.1 mm to 30 mm. Each discharge passage 22*b* also has a columnar shape.

One end (end on the lower side of FIG. 2) of the nozzle 22 in the longitudinal direction is connected to the ejection end of the ejector 21. Thus, an aerosol ejected from the ejection end of the ejector 21 is introduced into the introduction passage 22*a* of the nozzle 22 through the introduction port Ha, and thereafter moves to the plurality of discharge passages 22*b* while being branched, with the result that the aerosol is discharged (ejected) from the plurality of discharge ports Hb.

In the same way as in the ejector 21, in order to reduce the wear of the nozzle 22 due to the friction caused by the contact with powder, it is preferred that the surface of the nozzle 22 which comes into contact with powder be formed of diamond, diamond-like carbon (DLC), titanium nitride (TiN), titanium carbonitride (TiCN), silicon carbonitride (SiCN), silicon carbide (SiC), silicon nitride (SiN), a super hard material, or a material made of an alloy thereof or a combination thereof. Further, the surface of the nozzle 22 may be subjected to coating, plating, or lining.

The powder feeding device 24 is a device for dropping powder to the powder suction side in the ejector 21 so as to feed the powder to the ejector 21, and is an automatic feeding device capable of feeding a predetermined amount of powder. It is desired that the weight scale 25 (mass meter) be provided to the powder feeding device 24, and a volume meter can also be used in place of the weight scale. The feeding mechanism of the powder feeding device 24 is, for example, a screw feeding mechanism, and a rotary feeding mechanism, a vibratory feeding mechanism, a table feeding mechanism, or a belt feeding mechanism can be adopted as well. In the powder feeding device 24, automatic feeding in accordance with a time schedule, a change in feeding weight (mass), and the like can be performed, and further, a feeding rate (feeding amount/feeding time) can also be controlled easily.

The suction section 30 is provided on the other side of the workpiece securing section 10 and serves to suck an aerosol, which is obtained by mixing an aerosol ejected from the nozzle 22 with new gas (air), into the workpiece 11 (honeycomb filter precursor). The suction section 30 sucks the aerosol to the workpiece 11, and hence is located on an outlet side of the workpiece 11 when viewed from the workpiece securing section 10.

The suction section 30 mainly includes a suction machine 33 and a duct 34. The duct 34 is connected to the workpiece chuck 13*b*. The suction machine 33 is, for example, a fan, and a blower or a dust collector can be used as well. It is preferred that the suction section 30 be capable of controlling a suction flow rate. For example, the suction flow rate can be controlled by variably controlling the r.p.m. of a motor for the suction machine 33 or adjusting the diameter of the duct 34 (flow path) with a valve or the like. The preferred suction flow rate is about 0.1 $m^3$/min to 400 $m^3$/min in the case where the workpiece 11 is a honeycomb filter precursor to be used as, for example, a diesel particulate filter (DPF) mounted on an automobile.

An anemometer 32 is provided in the duct 34 (flow path) of the suction section 30 and configured to monitor a suction flow rate and provide data for control. The anemometer 32 is a hot-wire anemometer, and a mechanical anemometer, a pitot tube anemometer, and the like can be adopted as well. A filter may be disposed on the upstream side so as to protect the anemometer 32 from the powder having passed through the workpiece 11. Further, while an aerosol is being introduced into the duct 34, a cover may be provided so as to protect the anemometer 32 or a mechanism for retracting the anemometer 32 from the duct 34 may be provided. Further, a blow nozzle for removing powder adhering to the anemometer 32 may be disposed.

In the apparatus of the present invention, the powder transfer section 20 is positioned on the lower side and the suction section 30 is positioned on the upper side. That is, the side on which an aerosol is introduced into the workpiece 11 corresponds to the lower side, and the side on which the aerosol is discharged corresponds to the upper side. The direction of an air current extends from the lower side to the upper side. Therefore, powder not having adhered to the cell inner surface drops downward, and thus powder not having adhered to the cell inner surface can be collected easily.

In the apparatus of the present invention, the introduction section 40 serves as an opened space between the powder transfer section 20 and the workpiece securing section 10. In the introduction section 40, powder transferred together with an air current from the powder transfer section 20 is further mixed with another gas and introduced into the workpiece 11 secured in the workpiece securing section 10.

A guide member 42 provided in the introduction section 40 has a substantially cylindrical shape conforming to the substantially columnar workpiece 11. The guide member 42 having a length "L" is fixed to the workpiece securing section 10, and in the case of using the workpiece chucks 13*a*, 13*b*, the guide member 42 is connected thereto. The guide member 42 serves to introduce an aerosol ejected from the nozzle 22 into the workpiece 11 efficiently. On the other hand, the side of the guide member 42 opposite to the workpiece securing section 10 is opened, and gas is sucked from this side separately from gas passing through the nozzle 22. That is, new gas (air) is mixed with the aerosol ejected from the nozzle 22 to form a new aerosol, and the new aerosol is introduced into cells of the workpiece 11.

A metal and a resin are preferred as a material for the guide member 42 in the same way as in the cover 12. Specifically, there may be provided aluminum, stainless steel, brass, iron, an acrylic resin, vinyl chloride, nylon (polyamide resin), and Bakelite (phenol resin). It is particularly preferred that a conductive material be used for the guide member 42, and the guide member 42 be grounded. Further, in the same way as in the ejector 21 and the nozzle 22, in order to reduce the wear of the guide member 42 due to the friction caused by the contact with powder, it is preferred that the surface of the guide member 42 which comes into contact with powder be subjected to coating, plating, or lining through use of diamond, diamond-like carbon (DLC), titanium nitride (TiN), titanium carbonitride (TiCN), silicon carbonitride (SiCN), or a material made of an alloy thereof or a combination thereof. Further, it is also preferred to use silicon carbide (SiC) or a so-called super hard material as a material for a portion which comes into contact with powder.

(Method of Producing Honeycomb Filter)

Next, a method of producing a honeycomb filter is described. The production method is a method of producing, through use of the apparatus of the present invention, a "honeycomb filter including a base formed of a porous body having a substantially columnar outer shape, the base having a cell extending from one end surface to the other end surface, and a collection layer formed on an inner surface of the base".

First, a molding raw material containing a ceramic raw material is extruded to obtain a molded product, which has a substantially columnar outer shape and includes a plurality of cells extending from one end surface to the other end surface and serving as a flow path of a fluid. More specifically, aggregate particles preferably formed of any one of cordierite, silicon carbide, alumina, mullite, aluminum titanate, or silicon nitride, water, an organic binder (hydroxypropyl methylcellulose, methylcellulose, etc.), a pore forming material (graphite, starch, a synthetic resin, etc.), a surfactant (ethylene glycol, fatty acid soap, etc.) are mixed and kneaded with a kneader, a vacuum kneading machine, or the like to obtain a green body. The green body is extruded into a desired shape through use of an extruder including a die having a desired cell shape, partition wall thickness, and cell density, and thereafter, the extruded body is dried with a microwave drier and a hot-air drier to obtain a molded product.

Then, open ends of one end surface and open ends of the other end surface of a plurality of adjacent cells of the molded product are plugged alternately so that one end surface and the other end surface of the molded product both have a houndstooth pattern or a check pattern. Then, the resultant is fired to obtain a base. More specifically, slurry for plugging preferably made of the same material as that for the above-mentioned aggregate particles is retained in a container. About half of the cells on one end surface of the molded product are masked so as to obtain a houndstooth pattern or a check pattern, and the masked side of the molded product is soaked in the container so as to fill the slurry into openings of the cells which are not masked, with the result that one end surface of the molded product is plugged. At the other end surface of the molded product, the cells which have already been plugged at one end surface are masked (which necessarily forms a houndstooth pattern or a check pattern), and the masked side of the molded product is soaked in the container so as to fill the slurry into openings of the cells which are not masked, with the result that the other end surface of the molded product is plugged. Consequently, the cells which are not plugged at one end surface are plugged at the other end surface, and the cells which are not plugged at the other end surface are plugged at one end surface, with the result that the cells are alternately closed into a houndstooth pattern or a check pattern at both the end surfaces. Then, the molded product thus plugged is provisionally fired to be defatted and fired to obtain a base. The firing temperature of an organic binder is about 100° C. to 300° C., and the firing temperature of the pore forming material is about 200° C. to 800° C., and hence it is appropriate that the temperature for provisional firing is set to about 200° C. to 1,000° C. The firing temperature varies depending on the raw material for the aggregate particles, and hence it is appropriate that suitable conditions are selected in accordance with the raw material. In general, the firing temperature is about 1,400° C. to 1,500° C.

Next, the obtained base is weighed through use of a weigh scale having a resolution of preferably 10 mg or less (weighing step before film formation), and then an aerosol is introduced into cells of the base through use of the apparatus of the present invention, with the result that powder is deposited on an inner surface of each cell of the base (film formation step). The average particle diameter of powder (particles) varies depending on the average pore diameter of partition walls, and it is preferred that the average particle diameter be 1 μm to 15 μm. As the material for the powder, it is preferred to use silicon carbide, silicon nitride, cordierite, alumina, zirconia, titania, silica, aluminum titanate, or the like. The same material as that for the aggregate particles (of the base) is particularly preferred.

More specifically, the powder can be obtained as fine particles and pulverized particles having a sharp particle diameter distribution by subjecting the above-mentioned material to size classification and further pulverizing coarse particles through use of a jet mill (dry type) and a pot mill (wet type). Note that, even when powder having an average particle diameter smaller than an average pore diameter of partition walls in the base is used, the powder is deposited on each surface of the partition walls (in a strict sense, each surface layer (in a range of up to 20% from the surface of each partition wall in the thickness direction of the partition wall)). The reason for this is considered as follows. Although powder (particles) is smaller than pores of the partition walls, when an aerosol containing the powder passes through the partition walls, the aerosol is deposited on the surface (surface layer) of each partition wall without moving along a streamline of an air current due to the dispersion of the powder and the particle collection mechanism of obstruction.

When powder is caused to adhere to and deposited on the partition walls in the base through use of the apparatus of the present invention, the base (workpiece) is secured in the workpiece securing section 10, the amount of powder to be fed and the flow rate of an air current (air) from the pressurized gas feeder are respectively set to predetermined values in the powder transfer section 20, and the suction flow rate in the suction section 30 is set to a predetermined value. For setting the suction flow rate in the suction section 30, in order to deposit powder on each cell inner surface (each surface of partition walls) exactly with uniform thickness, it is important that the flow rate of the powder passing through (the partition wall of) the base be set to be larger than that of the powder passing through the ejector 21 and the nozzle 22.

After the powder is caused to adhere and deposited on each partition wall of the base, powder remaining at an end surface on a side (inlet side) of the base through which the aerosol has been introduced is removed through use of the aerosol or the like, (cleaning step). Then, the base with the powder deposited thereon (with a film formed thereon) is weighed through use of a weight scale having a resolution of preferably 10 mg or less (weighing step after film formation), and success or failure of film formation is confirmed.

Finally, the resultant is fired and the powder deposited on the cell inner surface is stabilized by sintering, with the result that a honeycomb filter is obtained. It is preferred that the firing temperature at this time be lower than the firing temperature when the base is obtained. It is appropriate that the powder is heated to temperature required for sintering and settling the powder. The sintering temperature varies depending on the material for the powder, and in general, the sintering temperature is preferably 1,250° C. to 1,350° C.

(Reduction in Variation of Distribution of Air Velocity of Aerosol Ejected from Nozzle)

In the above-mentioned honeycomb filter, it is preferred that the variation in thickness of collection layers to be formed be small among a plurality of cells. In order to reduce the variation in thickness of the collection layers among the plurality of cells, it is necessary that the degree of symmetry with respect to the center axis line X1 (see FIGS. 2 and 3) of the nozzle 22 in the longitudinal direction be high regarding the distribution state of an air velocity of an aerosol ejected from the nozzle 22. The description that "the degree of symmetry with respect to the center axis line X1 of the nozzle 22 is high" means that the variation in air velocity of an aerosol in a circumferential direction is small in regions at the same distance in a radial direction from the center axis line X1 of the nozzle 22.

A ratio of "sum of opening areas of the plurality of discharge ports Hb of the nozzle 22" with respect to an "opening area of the introduction port Ha of the nozzle 22" is defined to be an area ratio "α". In the example illustrated in FIGS. 2 and 3, considering that the introduction port Ha is a circle having the diameter $D_{in}$ (see FIG. 8), the discharge port Hb is a circle having a diameter $D_{out}$ (see FIG. 8), and the number of the discharge ports Hb is 4, a relationship of "$\alpha=(4 \cdot D_{out}^2)/D_{in}^2$" holds.

The inventor of the present invention found that there is a strong correlation between the "the degree of symmetry with respect to the center axis line X1 of the nozzle 22 regarding the distribution state of an air velocity of an aerosol" and the area ratio "α". Then, the inventor of the present invention found that the "the degree of symmetry with respect to the center axis line X1 of the nozzle 22 regarding the distribution state of an air velocity of an aerosol" becomes higher in the case where the area ratio "α" is 1 or more and 2 or less, compared to the case where the area ratio "α" is not in the above-mentioned range. A test for confirming the above-mentioned facts is described below.

(Test)

Figure 4:
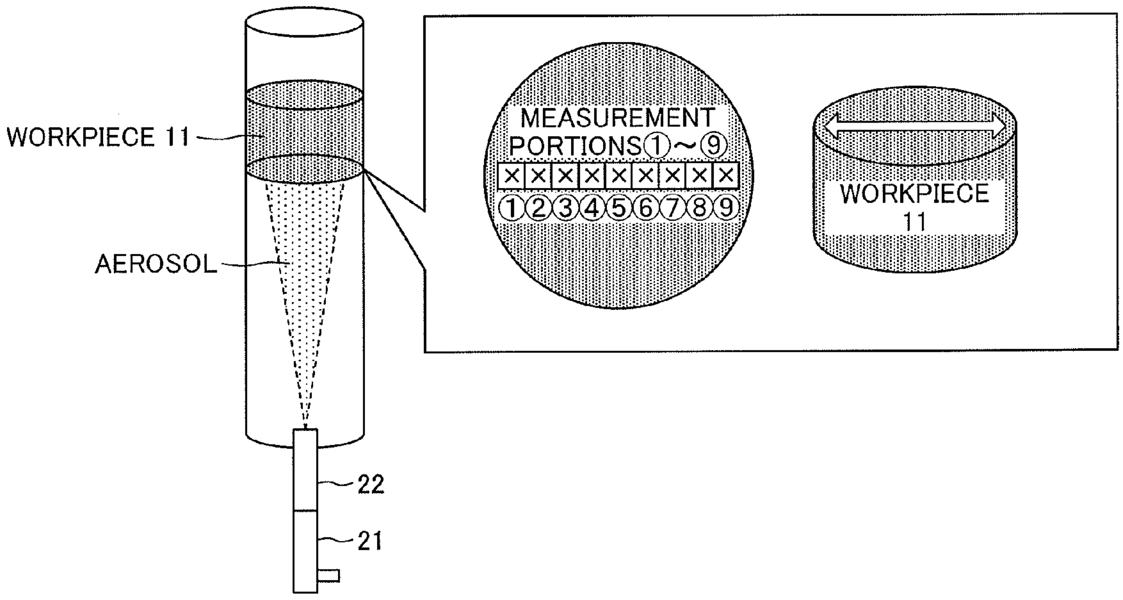
FIG. 4 is a view illustrating portions subjected to measurement of an air velocity of an aerosol in a test.

In this test, nozzles having seven kinds of patterns at different area ratios "α" as shown in Table 1 were prepared as the nozzle 22 illustrated in FIG. 2. In each pattern, the number of the discharge passages **22*b* was set to 4, and the branch angle θ of each discharge passage 22*b* was fixed to be 12.5°. As illustrated in FIG. 4, a test involving "mounting the nozzle 22 at a tip end of the ejector 21 and ejecting an aerosol to the workpiece 11 through use of the apparatus of the present invention" was performed successively for each pattern of the nozzle 22**.

TABLE 1

| Condition | | Air velocity of each measurement portion [m/sec] | | | | | | | | |
|---|---|---|---|---|---|---|---|---|---|---|
| Area ratio α | Branch angle θ | 1 | 2 | 3 | 4 | 5 | 6 | 7 | 8 | 9 |
| 0.3 | 12.5° | | | | | Clogged | | | | |
| 0.5 | 12.5° | | | | | Clogged | | | | |

TABLE 1-continued

| Condition | | | | | | | | | | |
|---|---|---|---|---|---|---|---|---|---|---|
| Area ratio α | Branch angle θ | Air velocity of each measurement portion [m/sec] | | | | | | | | |
| | | 1 | 2 | 3 | 4 | 5 | 6 | 7 | 8 | 9 |
| 0.8 | 12.5° | Clogged | | | | | | | | |
| 1.0 | 12.5° | 0.306 | 0.417 | 1.052 | 2.733 | 5.061 | 3.750 | 1.544 | 0.400 | 0.415 |
| 2.0 | 12.5° | 0.414 | 0.947 | 2.190 | 3.057 | 3.852 | 3.067 | 1.349 | 0.487 | 0.392 |
| 3.0 | 12.5° | 0.480 | 0.388 | 0.432 | 1.117 | 3.168 | 4.041 | 3.835 | 2.381 | 1.036 |
| 3.5 | 12.5° | 2.132 | 3.661 | 3.471 | 2.182 | 0.686 | 0.295 | 0.325 | 0.297 | 0.484 |

Common test conditions for each pattern are specifically as follows. As the workpiece 11, a columnar plugged honeycomb structure using silicon carbide as aggregate particles was used. When the workpiece 11 was secured in the workpiece securing section 10, the distance "d" (see FIG. 1) from the end surface of the workpiece 11 to the ejection end of the nozzle 22 was 290 mm, the length "L" (see FIG. 2) of the guide member 42 was 300 mm, and the inner dimension was a diameter of 50 mm. The axis length of the columnar workpiece 11 was set to 152.4 mm; the size (diameter) of a cross-section perpendicular to the axis, 36.2 mm; the cell density, 300 cpsi (cells/square inch); and the thickness of a partition wall, 12 mills (1 mill corresponds to about 0.0254 mm). The flow rate of gas to be sucked by the suction section 30 was set to 0.4 $m^3$/min; the flow rate of gas to be ejected from the powder transfer section 20, 0.1 $m^3$/min; and the flow rate of gas to be newly mixed in the introduction section 40, 0.3 $m^3$/min. The feeding amount of powder was set to 1.2 g; the feeding time, 3 seconds; and the feeding rate, 24 g/min.

Then, as illustrated in FIG. 4, the air velocity of an aerosol was measured for each pattern in "nice measurement portions" respectively corresponding to openings of "nine cells arranged linearly and including a cell in the workpiece 11 that is positioned coaxially with respect to the center axis of the workpiece 11". The positions in the axis direction of the "nine measurement portions" subjected to measurement of an air velocity were each set at an intermediate position between the lower end surface of the workpiece 11 and the lower end of the guide member 42. Table 1 and FIGS. 5 to 7 show the results.

As shown in Table 1, in the case where the area ratio "α" was less than 1 (specifically, in the case where α="0.3", "0.5", "0.8"), in a relatively earlier stage after the start of the test, an air velocity was not measured due to the "clogging" caused by the deposition of powder in the discharge passage 22*b* of the nozzle 22. Therefore, an air velocity was measured only in the case where α="1.0", "2.0", "3.0", "3.5".

Figure 5:
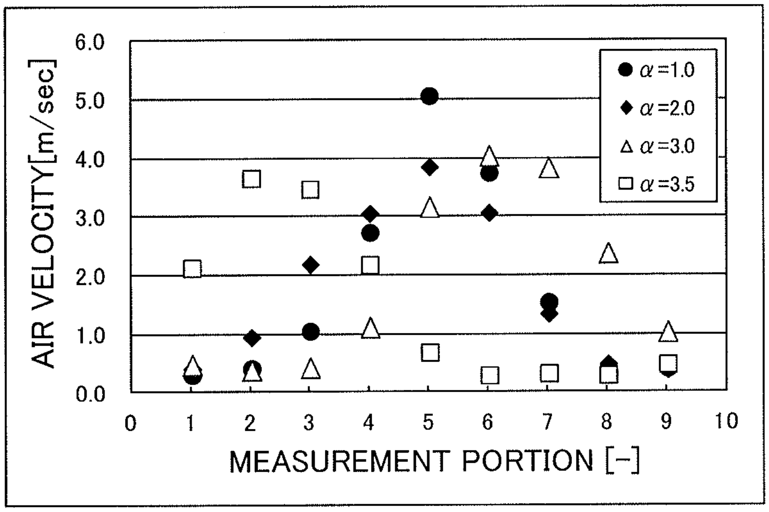
FIG. 5 is a graph showing relationships between the portions subjected to measurement of an air velocity of an aerosol and the measured air velocities.
Figure 6:
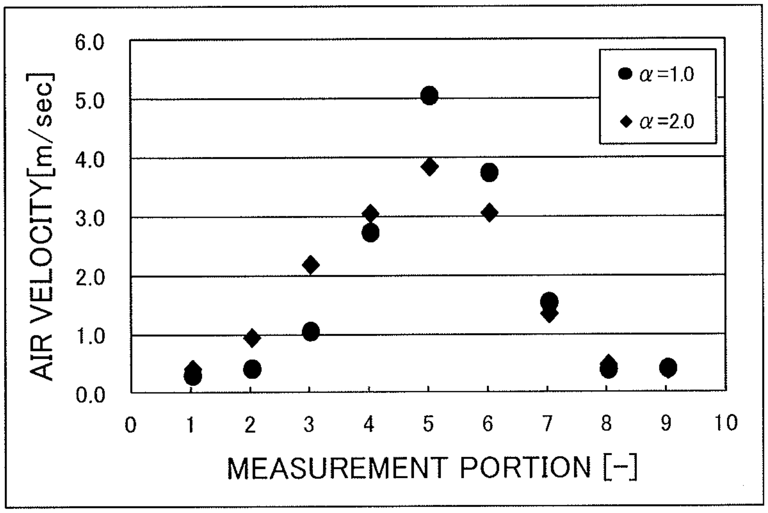
FIG. 6 is a graph showing only relationships between the portions subjected to measurement of an air velocity of an aerosol and the measured air velocities in the case where "α" is 1.0 and "α" is 2.0 in FIG. 5.
Figure 7:
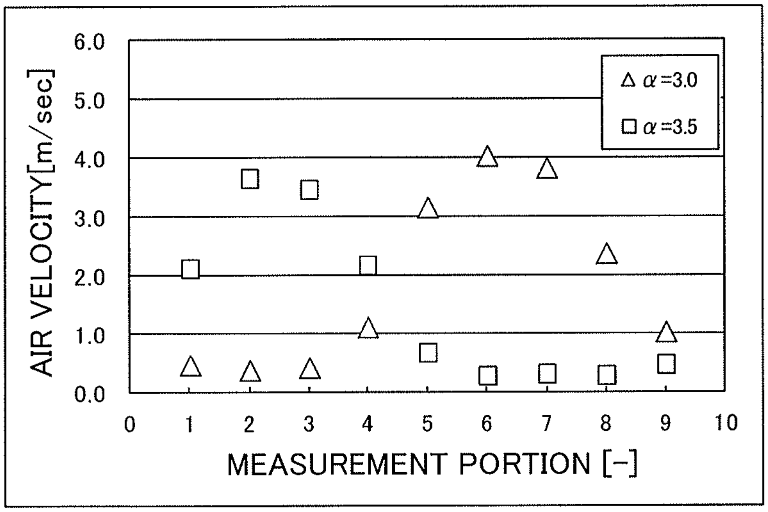
FIG. 7 is a graph showing only relationships between the portions subjected to measurement of an air velocity of an aerosol and the measured air velocities in the case where "α" is 3.0 and "α" is 3.5 in FIG. 5.

As is understood from FIGS. 5 to 7 (in particular, comparison results of FIGS. 6 and 7), in the case where "α" is 2 or less (specifically, in the case where α="1.0", "2.0"), the "degree of symmetry with respect to the center axis line X1 of the nozzle 22 regarding the distribution state of an air velocity of an aerosol" is significantly high. Note that, the description that the "degree of symmetry with respect to the center axis line X1" is high in FIGS. 5 to 7 means that a tendency of change in air velocity from the measurement portion "5" to the measurement portion "1" is close to a tendency of change in air velocity from the measurement portion "5" to a measurement portion "9". On the other hand, in the case where "α" is more than 2 (specifically, in the case where α="3.0", "3.5"), the "degree of symmetry with respect to the center axis line X1 of the nozzle 22 regarding the distribution state of an air velocity of an aerosol" is low.

Accordingly, when the number of the discharge passages 22*b* of the nozzle 22 is 4, the "degree of symmetry with respect to the center axis line X1 of the nozzle 22 regarding the distribution state of an air velocity of an aerosol" becomes higher in the case where the area ratio "α" is 1 or more and 2 or less, compared to the case where the area ratio is not in the above-mentioned range.

Note that, in this test, the branch angle θ is fixed to be 12.5° C., but it has been separately found that the same results as the above can also be obtained in the branch angle θ ranging from 5° to 30°.

Further, although the nozzle 22 having four discharge passages 22*b* was used in this test as illustrated in FIG. 2, the number of the discharge passages 22*b* may not be 4 (the number of the introduction passages 22*a* is fixed to be 1). It has been separately found that, in general, when the number of the discharge passages 22*b* is "n" ("n" is an integer of 2 or more), the "degree of symmetry with respect to the center axis line X1 of the nozzle 22 regarding the distribution state of an air velocity of an aerosol" becomes higher in the case where the area ratio "α" is 1 or more and $\sqrt{n}$ or less, compared to the case where the area ratio "α" is not in the above-mentioned range.

Further, although the nozzle 22 having the discharge passages 22*b* each extending linearly from the branch portion was used in this test, the nozzle 22 having discharge passages each extending in a curved shape from the branch portion may be used. However, it has been separately found that the "clogging" caused by the deposition of powder tends to occur in the discharge passages each extending in a curved shape, compared to the discharge passages each extending linearly.

A relationship between the "area ratio "α" of a nozzle" and the "pressure loss of the introduction passage and discharge passages of a nozzle" is described below additionally. In general, it is known that Expression (1) (so-called Hagen-Poiseuille equation) holds regarding a viscous fluid flowing through a circular pipe having a predetermined pipe diameter. In Expression (1), "D" represents a diameter of a pipe line; "U", a flow velocity; "L", a pipe line length; "μ", viscosity; and "ΔP", a pressure loss.

$$\Delta P = 32\mu\frac{U \cdot L}{D^2} \quad (1)$$

Thus, a pressure loss ΔP/L per unit length of the pipe line can be represented by Expression (2).

$$\frac{\Delta P}{L} = 32\mu\frac{U}{D^2} \quad (2)$$

Figure 8:
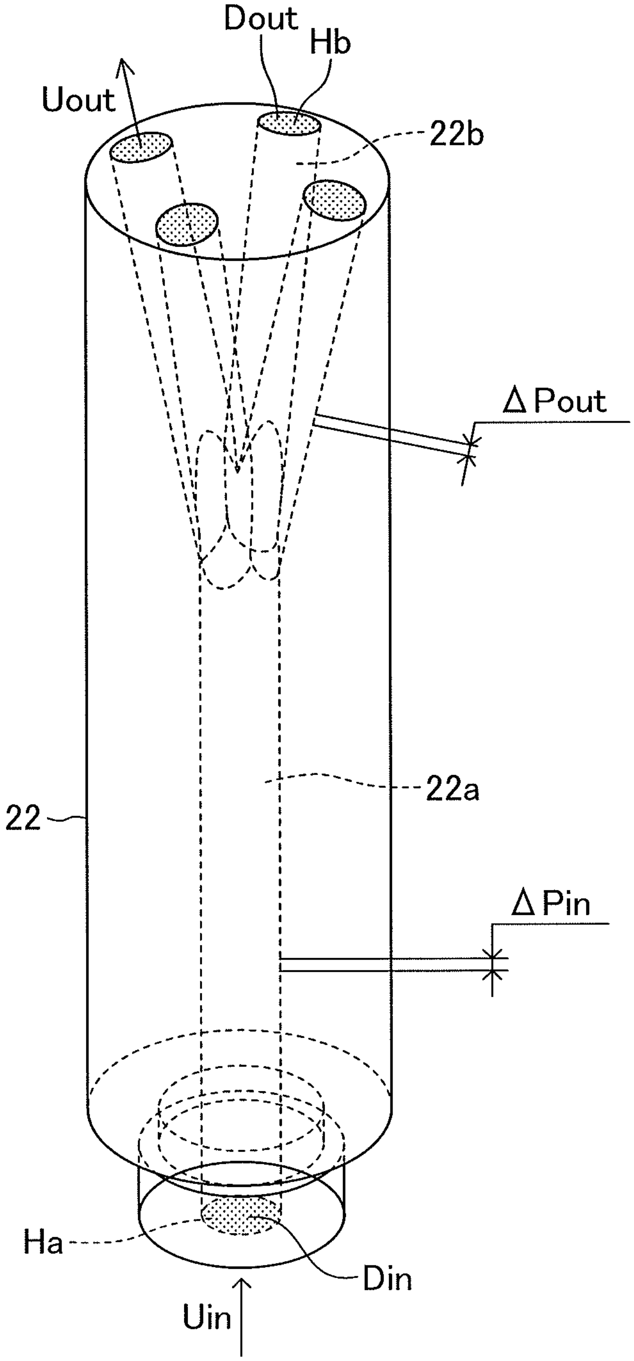
FIG. 8 is a view corresponding to FIG. 2, for illustrating dimensions and the like of each part of the nozzle illustrated in FIG. 1.

As illustrated in FIG. 8, in the nozzle 22, a pressure loss per unit length of the introduction passage 22*a* is defined to be $\Delta P_{in}$; a diameter of the introduction port Ha (diameter of the introduction passage 22*a*), $D_{in}$; a flow velocity of a fluid flowing into the introduction port Ha (flow velocity of a fluid in the introduction passage 22*a*), $U_{in}$; a pressure loss per unit length of the discharge passage 22*b*, $\Delta P_{out}$; a diameter of the discharge port Hb (diameter of the discharge passage 22*b*), $D_{out}$; and a flow velocity of a fluid flowing out of the discharge port Hb (flow velocity of a fluid in the discharge passage 22*b*), $U_{out}$. When Expression (2) is applied to the introduction passage 22*a* and the discharge passage 22*b* and is then rearranged, Expression (3) is obtained.

$$\frac{\Delta Pout}{\Delta Pin} = \left(\frac{Uout}{Dout^2}\right) \Big/ \left(\frac{Uin}{Din^2}\right) \quad (3)$$

On the other hand, the area ratio "α" can be represented by Expression (4) through use of the number "n" of the discharge passages 22*b*, the diameter of the introduction port $D_{in}$, and the diameter of the discharge port $D_{out}$. When Expression (4) is rearranged with respect to $D_{out}^2$, Expression (5) is obtained.

$$\alpha = \frac{n \cdot Dout^2}{Din^2} \quad (4)$$

$$Dout^2 = \frac{Din^2 \cdot \alpha}{n} \quad (5)$$

Further, a relationship of Expression (6) holds among $U_{out}$, $U_{in}$, and α.

$$Uout = \frac{Uin}{\alpha} \quad (6)$$

When the relationships of Expression (5) and Expression (6) are substituted into Expression (3) and are then rearranged, Expression (7) is obtained.

$$\frac{\Delta Pout}{\Delta Pin} = \frac{n}{\alpha^2} \quad (7)$$

As described above, when n=4, the condition that the "degree of symmetry with respect to the center axis line X1 of the nozzle 22 regarding the distribution state of an air velocity of an aerosol" becomes high is 1≤α≤2. When this condition (1≤α≤2) is substituted into Expression (7), Expression (8) is obtained. Further, when "n" is any integer of 2 or more, the condition that the "degree of symmetry with respect to the center axis line X1 of the nozzle 22 regarding the distribution state of an air velocity of an aerosol" becomes high is 1≤α≤√n. When this condition (1≤α≤√n) is substituted into Expression "7", Expression (9) is obtained.

$$1 \leqq \frac{\Delta Pout}{\Delta Pin} \leqq 4 \quad (8)$$

-continued $$1 \leqq \frac{\Delta Pout}{\Delta Pin} \leqq n \quad (9)$$

Accordingly, it can be said from Expressions (8) and (9) that the "degree of symmetry with respect to the center axis line X1 of the nozzle 22 regarding the distribution state of an air velocity of an aerosol" becomes higher in the case where a pressure loss ratio "$\Delta P_{out}/\Delta P_{in}$" is "1" or more (corresponding to α≤√n), compared to the case where the pressure loss ratio is not in the above-mentioned range. Further, it can be said that the "clogging" caused by the deposition of powder in the discharge passages 22*b* is less liable to occur in the case where "$\Delta P_{out}/\Delta P_{in}$" is "n" or less (corresponding to α≥1), compared to the case where "$\Delta P_{out}/\Delta P_{in}$" is not in the above-mentioned range.

In the nozzle 22 illustrated in FIGS. 2 and 3, the number of the introduction passages 22*a* is 1, and the number of the discharge passages 22*b* is 4. However, any relationship may be applied between the number of the introduction passages 22*a* and the number of the discharge passages 22*b* as long as the number of the discharge passages 22*b* is larger than that of the introduction passages 22*a*. For example, the number of introduction passages (number of introduction ports) may be 2, and the number of discharge passages (number of discharge ports) may be 8.

What is claimed is:

1. A nozzle for introducing thereinto an aerosol, being powder-dispersed gas, and discharging the introduced aerosol to an outside, the nozzle is formed into a shape having a longitudinal direction, the nozzle comprising:

a single introduction port for introducing the aerosol into the nozzle, with the single introduction port being formed at an end surface of the nozzle on one side in the longitudinal direction;

a plurality of discharge ports for discharging the introduced aerosol from the single introduction port to the outside, with the plurality of discharge ports being formed at an end surface of the nozzle on another side in the longitudinal direction;

a single introduction passage connected to the single introduction port such that the single introduction passage extends linearly from the single introduction port in the longitudinal direction of the nozzle; and a plurality of discharge passages each branched from an end portion of the single introduction passage on a side opposite to the single introduction port and connected to a corresponding one of the plurality of discharge ports, with the plurality of discharge passages each extending radially from the end portion of the single introduction passage to the corresponding one of the plurality of discharge ports in a direction tilted from the longitudinal direction of the nozzle, wherein, when a ratio of a sum of opening areas of the plurality of discharge ports with respect to an opening area of the single introduction port is defined to be "α", "α" is 1 or more, and when the number of the plurality of discharge ports is defined to be "n", "n" is an integer of 2 or more, "α" is 1 or more and √n or less.

2. A nozzle according to claim 1, wherein the plurality of discharge passages each extend linearly from the end portion of the single introduction passage to the corresponding one of the plurality of discharge ports.

* * * * *